United States Patent
Shibuya et al.

(10) Patent No.: US 6,416,562 B1
(45) Date of Patent: Jul. 9, 2002

(54) AIR FILTER MEDIUM, AIR FILTER PACK AND AIR FILTER UNIT COMPRISING THE SAME, AND METHOD FOR PRODUCING AIR FILTER MEDIUM

(75) Inventors: Yoshiyuki Shibuya; Kunihiko Inui; Hideyuki Kiyotani; Osamu Tanaka, all of Settsu (JP)

(73) Assignee: Daikin Industries, Ltd., Osaka (JP)

( * ) Notice: Subject to any disclaimer, the term of this patent is extended or adjusted under 35 U.S.C. 154(b) by 7 days.

(21) Appl. No.: 09/618,446

(22) Filed: Jul. 18, 2000

(30) Foreign Application Priority Data

Oct. 7, 1999 (JP) .............................. 11-286664
May 26, 2000 (JP) ......................... 2000-156434

(51) Int. Cl.⁷ .............................. B01D 39/16
(52) U.S. Cl. .............................. 55/486; 55/521; 55/528; 428/315.5
(58) Field of Search .................... 55/528, 486, 521, 55/497; 428/315.5

(56) References Cited

U.S. PATENT DOCUMENTS

| | | | |
|---|---|---|---|
| 4,902,423 A | 2/1990 | Bacino | |
| 5,234,739 A | 8/1993 | Tanaru et al. | |
| 5,507,847 A | 4/1996 | George et al. | |
| 5,772,884 A | 6/1998 | Tanaka et al. | |
| 5,834,528 A * | 11/1998 | Tanaka et al. | 264/235.8 |
| 5,910,277 A | 6/1999 | Ishino et al. | |
| 6,030,428 A | 2/2000 | Ishino et al. | |
| 6,214,093 B1 * | 4/2001 | Nabata et al. | 96/11 |
| 6,261,979 B1 * | 7/2001 | Tanaka et al. | 442/370 |
| 6,302,934 B1 * | 10/2001 | Nabata et al. | 55/486 |
| 6,336,948 B1 * | 1/2002 | Inoue et al. | 55/486 |

FOREIGN PATENT DOCUMENTS

| | | |
|---|---|---|
| EP | 0087149 | 8/1983 |
| EP | 0642922 A1 | 3/1995 |
| EP | 0808648 A1 | 11/1997 |
| EP | 0972559 A1 | 1/2000 |
| JP | 5202217 | 8/1993 |
| JP | 6218899 | 8/1994 |
| JP | 9504737 | 5/1997 |
| JP | 9206568 | 8/1997 |
| JP | 9302121 | 11/1997 |
| JP | 9302122 | 11/1997 |
| JP | 1030031 | 2/1998 |
| JP | 10287759 | 10/1998 |
| JP | 1180397 | 3/1999 |
| WO | 9416802 | 8/1994 |
| WO | 9826860 | 6/1998 |

OTHER PUBLICATIONS

"Standart of Test Method for Air Cleaner Devices (JACA No. 10c-1979)".

* cited by examiner

Primary Examiner—Robert A. Hopkins
(74) Attorney, Agent, or Firm—Birch, Stewart, Kolasch & Birch, LLP

(57) ABSTRACT

An air filter medium comprising a porous polytetrafluoroethylene film and an air-permeable support member laminated on at least one surface of said porous film and having a $PF_1$ value exceeding 22, which is calculated according to the following formula:

$$PF_1 = [-\log(\text{Penetration}(\%)/100)/\text{Pressure loss (mmH}_2\text{O)}] \times 100$$

in which the penetration (%)=100−Collection efficiency from a pressure loss (unit: mmH₂O) measured when an air is flowed through the air filter medium at a flow velocity of 5.3 cm/sec. and a collection efficiency (unit: %) measured using dioctyl phthalate having a particle size of 0.10 to 0.12 μm. This air filter medium has a low pressure loss and a high collection efficiency.

24 Claims, 2 Drawing Sheets

Unfolding　　Application　　Reciprocal
　　　　　　　of spacers　　standing
　　　　　　　　　　　　　　machine

US 6,416,562 B1

AIR FILTER MEDIUM, AIR FILTER PACK AND AIR FILTER UNIT COMPRISING THE SAME, AND METHOD FOR PRODUCING AIR FILTER MEDIUM

FIELD OF THE INVENTION

The present invention relates to an air filter medium, an air filter pack and an air filter unit comprising the same, and a method for producing an air filter medium. In particular, the present invention relates to an air filter medium comprising a porous polytetrafluoroethylene (PTFE) film and having a low pressure loss and a high particle-collection efficiency, an air filter pack and an air filter unit comprising such an air filter medium, and a method for producing such an air filter medium.

BACKGROUND ART

With the increase of the integration degrees of semiconductors, and the performances of liquid crystals, the degree of cleanness of clean rooms requires the increasingly high level in these years, and thus air filter units having increased particle-collection efficiencies are sought.

Hitherto, high-performance air filters used in such air filter units, in particular, HEPA, ULPA, etc. are prepared by folding filter media which are prepared from glass fibers by wet paper making methods.

However, it is desired to decrease the pressure loss of the air filter units for further reduction of the ventilation power cost and to increase the collection efficiency to realize the cleaner clean rooms, but it is very difficult to achieve the high quality of the air filter units made of the glass fiber (the high collection efficiency when the pressure loss is the same, or the lower pressure loss when the collection efficiency is the same)

Thus, to produce high performance air filter units, air filter units comprising a PTFE porous film, having the better performance than the glass fiber filter media are proposed. It is reported that the pressure loss of a ULPA comprising the PTFE film decreases to two thirds ($2/3$) of that of the ULPA comprising the glass fiber filter medium (JP-A-5-202217, WO94/16802 and WO98/26860)

The performances of the air filter units comprising the PTFE porous films can be improved by production methods and processing methods, and the PTFE porous films having better properties are proposed. A sole PTFE porous film having high properties (that is, a porous film to which no air-permeable support member is laminated to form a filter medium) is disclosed in JP-A-9-504737, JP-A-10-30031, JP-A-10-287759 and WO98/26860. These patent publications disclose PTFE porous films having a high PF (Performance Factor), which is one index of the performance of the air filter media.

However, it is practically necessary to laminate an air-permeable support member to the PTFE porous film so that the PTFE film is used as an air filter media, since the strength of the PTFE porous film as such should be increased from the viewpoint of handling properties, and the damage of the filter media should be avoided when the filter medium is shaped in a desired form.

As described above, the sole PTFE porous films having the high PF value are known. For example, JP-A-10-30031 describes the PTFE porous film having a PF value of 30. However, among air filter media comprising the laminate of the PTFE porous film and the air-permeable support member, one having a PF value of 19.8 is known from JP-A-10-30031, and one having a PF value of 21.8 is known from WO98/26850, but one having a PF value of larger than 22 has not been known.

In the case of an air filter unit comprising a pleated air filter medium having a PTFE porous film and an air permeable support member laminated to the porous film, WO98/26860 discloses an air filter unit having a PF value of 90.6, although how to produce it is not disclosed. However, any air filter unit having a PF value of larger than 90.6 or how to produce such an air filter unit is not disclosed.

SUMMARY OF THE INVENTION

The first object of the present invention is to provide a high performance air filter medium having a low pressure loss and a high collection efficiency, which comprises a PTFE porous film and an air-permeable support member laminated on at least one surface of the PTFE porous film.

The second object of the present invention is to provide an air filter pack having a low pressure loss and a high collection efficiency, which is prepared by pleating an air filter medium comprising a PTFE porous film and an air-permeable support member laminated on the PTFE porous film.

The third object of the present invention is to provide an air filter unit having a low pressure loss and a high collection efficiency and comprising a frame and an air filter pack, which is prepared by pleating an air filter medium comprising a PTFE porous film and an air-permeable support member laminated on the PTFE porous film, stored in the frame.

The fourth object of the present invention is to provide an air filter unit comprising a frame and an air filter pack, which is prepared by pleating an air filter medium comprising a PTFE porous film and an air-permeable support member laminated on the PTFE porous film, stored in the frame, which unit maintains the high performance and is compact (that is, a low folded height (pleat depth) in an air filter pack comprising the pleated air filter medium).

The fifth object of the present invention is to provide an efficient method for producing the above air filter medium.

According to the present invention, the above objects are achieved by (1) an air filter medium comprising a porous polytetrafluoroethylene film and an air-permeable support member laminated on at least one surface of said porous film and having a $PF_1$ value exceeding 22, which is calculated according to the following formula:

$$PF_1 = [-\log(\text{Penetration }(\%)/100)/\text{Pressure loss (mmH}_2\text{O})] \times 100$$

in which the penetration (%)=100−Collection efficiency from a pressure loss (unit: mmH$_2$O) measured when an air is flowed through the air filter medium at a flow velocity of 5.3 cm/sec. and a collection efficiency (unit: %) measured using dioctyl phthalate having a particle size of 0.10 to 0.12 μm;

(2) an air filter pack comprising a pleated air filter medium which comprises a porous polytetrafluoroethylene film and an air-permeable support member laminated on at least one surface of said porous film, and having a $PF_2$ value exceeding 90.6, which is calculated according to the following formula:

$$PF_2 = [-\log(\text{Penetration }(\%)/100)/\text{Pressure loss (mmH}_2\text{O})] \times 100$$

in which the penetration (%)=100−Collection efficiency from a pressure loss (unit: mmH$_2$O) measured when an air is flowed through the air filter pack at a filter medium passing velocity of 1.4 cm/sec. and a collection efficiency (unit: %) measured using dioctyl phthalate having a particle size of 0.10 to 0.12 μm;

(3) an air filter unit comprising a frame and an air filter pack comprising a pleated air filter medium stored in said frame, wherein said filter medium comprises a porous polytetrafluoroethylene film and an air-permeable support member laminated on at least one surface of said porous film, and said unit has a $PF_3$ value exceeding 90.6, which is calculated according to the following formula:

$$PF_3 = [-\log(\text{Penetration } (\%)/100)/\text{Pressure loss (mmH}_2\text{O})] \times 100$$

in which the penetration (%)=100−Collection efficiency from a pressure loss (unit: mmH$_2$O) measured when an air is flowed through the air filter unit at a filter medium passing velocity of 1.4 cm/sec. and a collection efficiency (unit: %) measured using dioctyl phthalate having a particle size of 0.10 to 0.12 μm;

(4) an air filter unit comprising a frame and an air filter pack comprising a pleated air filter medium stored in said frame, wherein said filter medium comprises a porous polytetrafluoroethylene film and an air-permeable support member laminated on at least one surface of said porous film and has a $PF_1$ value exceeding 22, said air filter medium is pleated at a folded height (pleat depth) of 30 mm or less, and a pressure loss is at least 1 mmH$_2$O when measured by flowing an air through the air filter unit at a filter medium passing velocity of 1.4 cm/sec.; and (5) a method for producing an air filter medium comprising the steps of:
laminating an air-permeable support member on at least one surface of a porous polytetrafluoroethylene film while heating, and
cooling said laminate of said support member and said porous film just after lamination.

DETAILED DESCRIPTION OF THE INVENTION

Air Filter Medium

Figure 1:
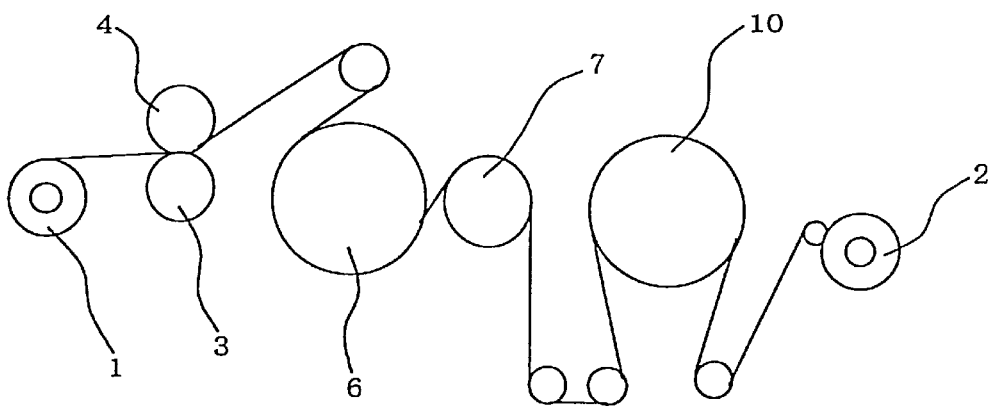
FIG. 1 is a schematic view of an apparatus used to stretch a PTFE film in a machine direction.

The air filter medium of the present invention comprises a PTFE porous film and an air-permeable support member laminated on at least one surface of the PTFE porous film, and is characterized in that the above-defined $PF_1$ value exceeds 22.

The air filter medium of the present invention has the air-permeable support member laminated on at least one surface of the PTFE porous film, and may have a two-ply structure consisting of the air-permeable support member and the PTFE porous film, a three-ply structure consisting of the air-permeable support member, the PTFE porous film and the air-permeable support member, or a five-ply structure consisting of the air-permeable support member, the PTFE porous film, the air-permeable support member, the PTFE porous film and the air-permeable support member. Preferably, the air-permeable support members are laminated on the both surfaces of the PTFE porous film. In this case, the handling of the PTFE porous film becomes easy, and the damage of the PTFE porous film during handling can be suppressed as much as possible.

The PTFE porous film may be a single layer film, or optionally a multi-layer film. The film having the multi-layer structure can compensate each other even when one of the layers has defects such as pinholes, or it can be flexibly designed to comply with the required properties of the filter medium. For example, when two PTFE porous films having the same properties are laminated, the collection efficiency can be increased although the pressure loss is doubled on calculation.

The air filter medium of the present invention preferably has a pressure loss of at least 4 mmH$_2$O, more preferably 5 to 100 mmH$_2$O, particularly preferably 10 to 50 mmH$_2$O, when the air is passed through the air filter medium at a flow velocity of 5.3 cm/sec. When the pressure loss is less than 4 mmH$_2$O, it may be difficult to achieve the collection efficiency of the assembled air filter unit of at least 99% in some cases. When the pressure loss exceeds 100 mmH$_2$O, the assembled air filter unit has a very large pressure loss so that the application of the air filter may be limited.

The characteristics of the air filter medium of the present invention is that the above-defined $PF_1$ value exceeds 22. Preferably, the $PF_1$ value is at least 23, more preferably at least 24, particularly preferably at least 25.

With the air filter medium having the high $PF_1$ value of, for example, at least 23, at least 24 or at least 25, the air filter pack and the air filter unit having higher performances (higher $PF_2$ value or $PF_3$ value). In addition, as described below, the air filter unit can be made compact (the very thin air filter unit) while maintaining the high performance of the air filter unit.

In the case of the $PF_1$ value of the air filter medium of the present invention, even if the difference of the absolute values of the $PF_1$ values is 1 (one), the difference of the absolute values of the $PF_3$ values is 4 or more. The reason for this is as follows:

When the air flow velocity is changed from 5.3 cm/sec. to 1.4 cm/sec., the pressure loss decreases by the factor of 1.4/5.3. Therefore, even if the collection efficiency does not change, the PF value increases by the factor of 5.3/1.4 (=3.79) on calculation. Furthermore, the collection efficiency increases as the flow velocity of the air decreases. Thus, the PF value further increases, and the absolute value of the PF value becomes 4 or more.

In the concrete, as the $PF_1$ value of the air filter increases by 1 (one), the $PF_3$ value of the air filter unit increases by 4 or more. Thus, when the pressure loss of the air filter unit is the same, the collection efficiency increases. When the collection efficiency of the air filter unit is the same, the pressure loss decreases. For example, when the $PF_3$ value of the air filter unit increases from 92 to 96, the collection efficiency increases from 99.9989% to 99.99935%, if the pressure loss is constant at 5.4 mmH$_2$O. This increase is significant.

The air filter medium of the present invention preferably has a collection efficiency of at least 99.9%, more preferably at least 99.99%. The air filter medium having a collection efficiency of at least 99.9% can provide an air filter unit having a collection efficiency of the same level as that of HEPA, and the air filter medium having a collection efficiency of at least 99.99% can provide an air filter unit having a collection efficiency of the same level as that of ULPA.

Here, the PTFE porous film and the air-permeable support member, which constitute the air filter medium of the present invention, are explained.

The PTFE porous film which can be used in the present invention may be any PTFE porous film insofar as it has a PF value exceeding 22, and a conventional PTFE porous film may be used. Such PTFE porous films are described in JP-A-10-30031, JP-A-10-287759 and JP-A-9-504737.

The preferably used PTFE porous film has a PF value of at least 27, more preferably at least 28.

The thickness of the PTFE porous film is preferably at least 5 $\mu$m, more preferably at least 8 $\mu$m. The PTFE porous film having the same PF value and the larger thickness can capture the larger amount of floating fine particles, and thus provide the air filter medium with a long life. In addition, when the PTFE porous film has a large thickness, the formation of pinholes can be suppressed in the course of the lamination of the PTFE porous film and the air-permeable support member and/or the pleating of the air filter medium.

The PTFE porous film preferably has an average fiber diameter of 0.14 $\mu$m or less, more preferably from 0.05 to 0.1 $\mu$m. According to the single fiber collection theory, as the fiber diameter of a filter medium increases, the adsorption ability of the particles to the fibers themselves decreases. Then, when the average fiber diameter exceeds 0.14 $\mu$m, it is difficult to obtain a porous film having a high PF value. When the average fiber diameter is less than 0.05 $\mu$m, a porous film can have a high PF value, but the strength of the porous film structure deteriorates, and the PF value is significantly decreased due to lamination as described below, so that it is difficult to obtain an air filter medium having a sufficiently high PF value.

A packing density of the PTFE porous film is 12% or less, preferably 10% or less, more preferably 8% or less. The packing density represents the degree of stuffing of the fibers in a space. As the packing density decreases, the voids in the porous film increases and the distance between the fibers increases. Thus, preferably, the particles are more easily adsorbed on the fibers of the porous film, and the PF values and also the amount of the captured particles increase.

The PTFE porous film, which is preferably used in the present invention, may be produced by the following method:

Production of Preferable PTFE Porous Film

The PTFE porous film is preferably an expanded porous film.

To produce the expanded PTFE porous film, a liquid lubricant such as solvent naphtha, white oil, etc. is added to a PTFE fine powder, which is prepare by coagulating the aqueous dispersion of emulsion-polymerized PTFE, and the mixture is paste extruded to obtain a rod. Then, the rod-form paste extrudate is rolled to obtain unsintered PTFE. The thickness of the unsintered PTFE tape is usually from 100 to 500 $\mu$m.

The unsintered tape is stretched in the machine direction (MD) at an expansion ratio of 2 to less than 10 times, and then in the transverse direction (TD). In this stretching process, the film is preferably stretched at a stretching rate of at least 200%/sec. in the transverse direction. As the stretching rate in the transverse direction increases, the fiber diameter of the PTFE porous film decreases so that the PTFE film having a higher PF value can be obtained. The expansion ratio in the transverse direction is preferably set so that the area expansion ratio in total is in the range between 100 and 300 times.

The stretching in the machine direction is carried out at a temperature lower than the melting point of sintered PTFE, and the stretching in the transverse direction is carried out at a temperature in the range between 200 and 420° C.

The stretching of the unsintered tape may be carried out with laminating two or more tapes, if necessary.

After the stretching in the transverse direction, the PTFE porous film may be optionally heat set to prevent the shrinkage.

A non-fibrous material may be compounded with the PTFE fine powder in an amount of 10 to 50 wt. parts per 100 wt. parts of the PTFE fine powder to increase the thickness of the PTFE porous film and to further decrease the packing density of the film.

The above-obtained PTFE porous film has a PF value exceeding 22, and one having a PF value of at least 27 is easily obtained. Since the total expansion ratio in the machine and transverse directions is not so high, the PTFE porous film having a relatively large thickness (at least 5 $\mu$m), and a low packing density of 12% or less, preferably 10% or less, more preferably 8% or less can be obtained.

The air-permeable support member used in the air filter medium of the present invention may be any support member that is conventionally used to reinforce the PTFE porous film, insofar as it has no influence on the pressure loss of the air filter medium, that is, it has a pressure loss much lower than that of the PTFE porous film.

Preferably, non-woven fabric having fusion bonding properties at least one its surface is used. More preferably, non-woven fabric comprising core-sheath structure fibers (for example, fibers consisting of a core of polyester and a sheath of polyethylene, or a core of high-melting point polyester and a sheath of low melting point polyester). The non-woven fabric comprising the core-sheath structure fibers can be laminated at a relatively low temperature slightly higher than the melting point of the sheath which is lower than that of the core. Therefore, it can reduce the thermal history in the course of the lamination of the air-permeable support member on the PTFE porous film, and thus the decrease of the PF value of the laminate of the PTFE porous film and the air-permeable support member, which will be described below, can be suppressed.

Lamination of PTFE Porous Film and Air-permeable Support Member

The air filter medium of the present invention is preferably produced by laminating the PTFE porous film and the air-permeable support member as follows:

Daikin Industries Limited produces and sells air filter media comprising the laminated PTFE porous material and air-permeable support member, and air filter packs and air filter units comprising such air filter media. It is known that the pressure loss generally increases when the air-permeable support member is laminated on the PTFE porous film in the production process of the air filter media. In addition, it has been found that such lamination induces the decrease of the capture efficiency in addition to the increase of the pressure loss, and as a result, the PF value of the laminate decreases, and also found that it is very important to find better lamination conditions, which are not known, so that air filter media having higher PF values are obtained.

Practically, in JP-A-10-30031, the lamination may be carried out by a conventional method, since no specific lamination method (or conditions) is described. When- an air-permeable support member was laminated on a PTFE porous film having a PF value of 26.6, the PF value of the air filter medium decreased to 19.8. Furthermore, none of other prior art publications could have obtained air filter media having a PF value exceeding 22, when the air-permeable support member was laminated on the PTFE porous film.

Meanwhile, as a method for laminating an air-permeable support member on a PTFE porous material, for example, Daikin Industries Limited proposed a method comprising laminating them without pressing them in the thickness direction of the PTFE porous film so that the pressure loss of the PTFE porous film is maintained as much as possible (see JP-A-6-218899). When it was tried to laminate the air-permeable support member on PTFE porous films having various PF values by the above-disclosed lamination method, the decrease of the PF value after lamination could be suppressed to some extent when the PTFE porous film had a PF value of 22 or less, but the PF value of the laminate decreased when the PTFE porous film had a PF value of higher than 22 (for example, a porous film having a PF value of 30 disclosed in JP-10-30031) and thus only the laminates having a PF value of 22 or less could be obtained.

A reason for the above tendency of the PF values depending on the lamination method (conditions) disclosed in JP-A-6-218899 may be assumed as follows:

As the PF value of the simple PTFE porous film further increases beyond 22, the average fiber diameter of the PTFE porous film further decreases and also the packing density decreases. In addition, a PTFE porous film having a thickness of 5 μm or more is preferably used to capture the larger amount of floating particles in order to increase the life of the filter medium.

The fibers of such a PTFE porous film having a high PF value tend to be thermally coagulated by the compression in the thickness direction caused by the unwinding and winding tension and the thermal shrinkage of the film in the course of lamination. These points are further investigated.

That is, it may be assumed that the distances between the fibers, in particular, those in the thickness direction, of the PTFE porous film are decreased by the compression, and thus the effect of each fiber to capture the particles, in particular, the capturing effect inside the PTFE porous film, deteriorates to cause the deterioration of the collection efficiency as a whole. Furthermore, it may be assumed that the number of the fibers in the PTFE porous film are reduced by the thermal coagulation of the fibers and thus the increase of the diameter of one fiber may cause the deterioration of the collection efficiency of the film. Consequently, the above-described phenomena would appear even under the relatively mild conditions disclosed in JP-A-6-218899, and as a result, the collection efficiency of the film may decrease.

JP-A-6-218899 discloses also a method for laminating the PTFE porous film and the air-permeable support member by their own weights without the application of pressure. However, the lamination temperature is set high to laminate them only by the own weights. Therefore, the PTFE porous film thermally shrinks to decrease the PF value. In addition, it may be difficult to laminate them by this method in a length necessary for the production of a filter unit (20 m or longer).

Thus, lamination methods (conditions) have been investigated based on the above observations, and then it has been found that the desired air filter medium of the present invention can be produced when the following conditions are employed:

(1) to reduce the thermal history in the course of lamination as low as possible;

(2) to decrease the unwinding and winding tension as much as possible (3) preferably to forcibly cool the laminate just after the lamination by blowing cooled air to the laminate, etc.

Figure 2:
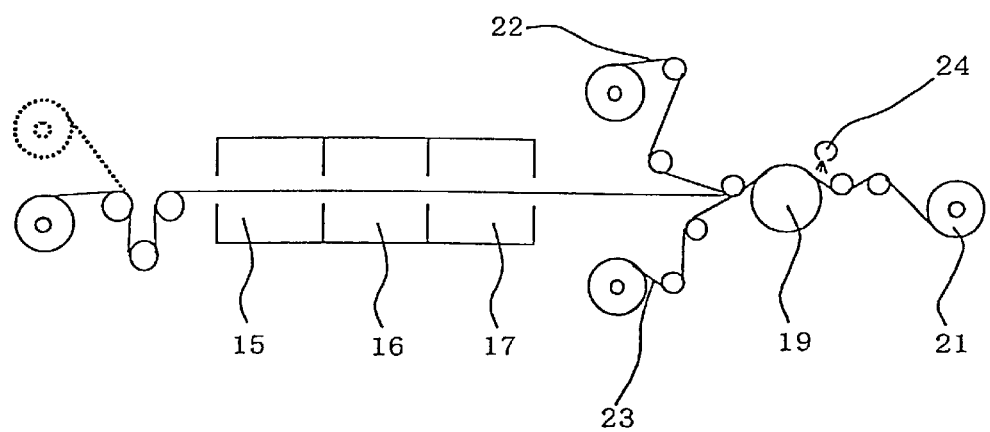
FIG. 2 schematically shows an apparatus for stretching a PTFE film in a transverse direction (left side half), and an apparatus for laminating air-permeable support members on the PTFE film.

In the concrete, the lamination is preferably carried out as follows:

In one preferred embodiment of the present invention, as shown in the right side half of FIG. 2, a PTFE porous film and air-permeable support members are laminated by placing a pair of the air-permeable support members 22, 23, preferably thermoplastic non-woven fabrics (e.g. non-woven fabrics of core-sheath structure fibers consisting of a core of polyester and a sheath of polyethylene) on the both surfaces of a biaxially stretched PTFE porous film, which is supplied from a tenter shown in the left side half of FIG. 2, and then the laminate is in contact with the heat roll 19.

Here, the temperature of the heat roll 19 is preferably from 130 to 220° C., more preferably from 140 to 170° C. When the laminate of the air-permeable support members and the PTFE porous film is in contact with the heat roll 19, the compression pressure against the roll 19 can be adjusted by the unwinding tension of the air-permeable support member 22, and is preferably from 10 to 90 g/cm, more preferably from 30 to 70 g/cm.

More preferably, the lamination can be carried out (a) under an unwiding tension of 70 to 90 g/cm at a line speed of at least 5 m/min. when the heating temperature is from 130° C. to less than 140° C., (b) under an unwinding tension of 30 to 70 g/cm at a line speed of at least 10 m/min. when the heating temperature is from 140° C. to less than 170° C., or (c) under an unwinding tension of 10 to 30 g/cm at a line speed of at least 15 m/min. when the heating temperature is from 170° C. to less than 220° C.

The winding tension is usually 380 g/cm or less, preferably 300 g/cm or less. When the laminate is wound on the roll 21 under a high tension, the PTFE porous film may be compressed in the thickness direction, and the PF value may decrease.

The laminate of the PTFE porous film and the air-permeable support members is preferably cooled just after lamination. The cooling can be carried out by placing the blowing nozzle 24 just downstream the heat roll 19, introducing an ambient air (preferably 50° C. or less, more preferably 40° C. or less) in the nozzle with a blower, or introducing a forcibly cooled air in the nozzle, and blowing the air from the nozzle onto the laminated air filter medium.

Air Filter Pack and Air Filter Unit of the Invention

In general, the air filter unit can be produced by pleating the air filter medium to obtain an air filter pack, and then integrating the pack with a frame. The specific procedures are described below.

The air filter unit includes a mini-pleats type unit and a separator type unit.

Mini-pleats Type Unit

The production method of the mini-pleats type unit comprises the steps of:

pleating the air filter medium in the folded form, unfolding the pleated air filter medium, applying a spacer in the form of, for example, a string on the air filter medium, pleating again the air filter medium to which the spacer is applied, cutting the pleated air filter medium in a designed size (finishing of the air filter pack according to the present invention), and surrounding the four sides of the air filter pack with a frame and sealing the air filter pack and the frame.

Figure 4:
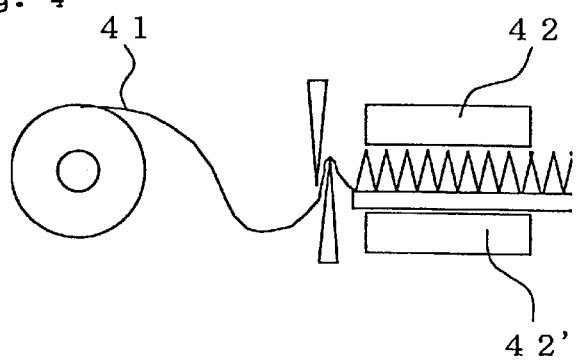
FIG. 4 is a schematic view of a reciprocal folding machine.

To pleat the air filter medium in the folded form, in general the air filter medium is folded with reciprocating blades as shown in FIG. 4.

Figure 5:
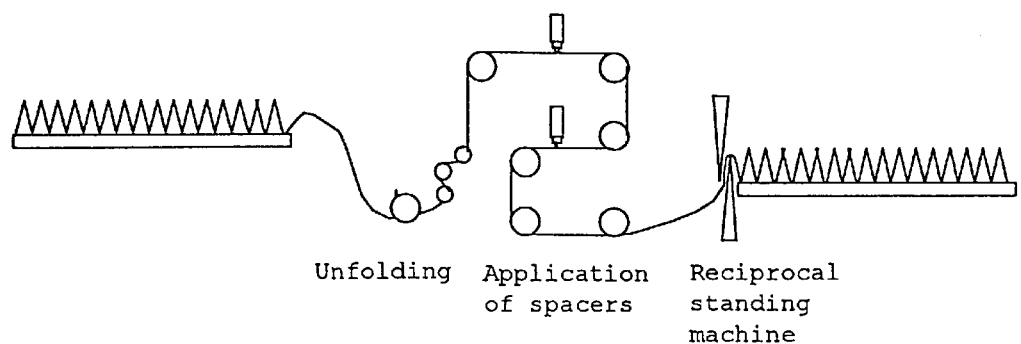
FIG. 5 schematically shows the steps to coat spacers.
Figure 6:
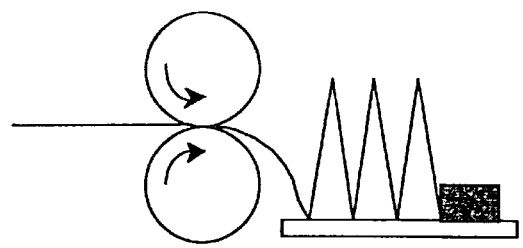
FIG. 6 schematically shows a roll-raising machine.

To pleat the air filter medium, to which the spacer is applied, again in the folded form, the air filter medium which is conveyed with a pair of rolls and stood up with a weight placed at the exit as shown in FIG. 6, or the air filter medium is stood up with the reciprocating blades as shown in FIG. 5.

In general, as shown in FIG. 4, the air filter medium 41 is unwound using nip rolls, that is, the air filter medium is nipped between a pair of driving rolls and unwound by driving the rolls, and then the air filter medium is pleated with the reciprocating blades. Thereafter, the pleated air filter medium is unfolded, and the spacer is applied to the member as shown in FIG. 5. Then, the unfolded air filter medium is again pleated using the rolls of FIG. 6.

The spacer in the mini-pleats type unit is applied to maintain the pleated form and also the flow paths of the gasses. The material of the spacers is not limited, and conventionally used hot-melt resins such as ethylene copolymers, propylene copolymers, EVA (ethylene-vinyl acetate copolymers), polyamide, etc. or glass yarns can be used.

When the hot-melt polyamide resin is used as the spacers of the air filter pack and unit of the present invention, the obtained air filter pack and unit have not only the desired high PF value but also an added value that the amount of generated organic materials represented by TOC (total Organic Carbon) is very low.

The mini-pleats type units are preferably used in apparatuses for the production of semiconductors. If the organic materials represented by TOC are generated in the course of the production of the semiconductors, they are deposited on the silicon wafer surfaces, and carbonized in the steps where heat is applied to the wafers so that the electrical properties are deteriorated. The air filter pack or unit having the spacers of the hot melt polyamide resin can contribute to the improvement of the energy efficiency due to the high PF value and also to the increase of the yield in the semiconductor production process.

Separator Type Unit

The production method of the separator type unit comprises the steps of:

pleating the air filter medium, inserting a corrugated separator between the pleats of the pleated air filter media, cutting the pleated air filter media in a designed size (finishing of the air filter pack according to the present invention), and surrounding the four sides of the air filter pack with a frame and sealing the air filter pack and the frame.

The following production method is preferable to effectively reflect the PF value of the air filter medium of the present invention comprising the PTFE porous film and the air-permeable support member in the air filter pack and unit.

That is, the air filter unit is produced by employing at least one of the following methods:

(1) in the step to pleat the air filter medium in the folded form, the air filter medium is forcibly unwound using a roll to the shaft of which a motor is connected but using no nip rolls, so that no force is applied in the thickness direction of the air filter medium, (2) in the step to pleat the air filter medium in the folded form, the pleated member is well-folded by heating it with the heating means 42, 42' shown in FIG. 4 at a temperature of 60 to 110° C., (3) when the air filter medium is re-pleated after unfolding the air filter medium and applying the string-form spacers to the unfolded member, the folding lines are clearly made by forcibly pleating the air filter medium using the reciprocating blades, (4) in all the steps, the air filter medium is conveyed using no nip rolls so that the air filter medium is not compressed.

The $PF_2$ or $PF_3$ value of the air filter pack or unit of the present invention exceeds 90.6, preferably at least 92, more preferably at least 95.

In general, the PF value increases, the pressure loss of the unit can be set lower to achieve the same collection efficiency. With the units having the same pressure loss, as the PF value increases, the collection efficiency can be set higher. When the $PF_2$ or $PF_3$ value exceeds 90.6 according to the present invention, ULPA and HEPA having a very low pressure loss, which may not be attained by the conventional ones, can be obtained.

The collection efficiency of the air filter pack or unit of the present invention is preferably at least 99.9%, more preferably at least 99.999% at a filter medium passing velocity of 1.4 cm/sec.

In general, it is better for the air filter pack or unit of the present invention to have the lower pressure loss, and the pressure loss is preferably from 1 to 25.4 $mmH_2O$, more preferably from 1 to 15 $mmH_2O$ at a filter medium passing velocity of 1.4 cm/sec.

Now, the methods for evaluating the performance of the air filter unit is explained.

The shape of the air filter unit of the present invention varies with the applications of the unit. For example, the air filter unit may have a streamer shape in which the filter unit is shaped in the form of a bag; a shape where the air filter medium is pleated and the corrugated spacer is inserted between the pleats of the pleated air filter medium to maintain the flow paths of the air; a shape where the air filter medium is pleated and string-form spacers of a hot melt are applied in the lengthwise direction of the air filter medium to maintain the flow paths of the air; and the like.

Also the height of each pleat of the pleated air filter medium (the length of the air filter medium from one folding line to the next folding line) varies.

In general, the air velocity in the measurement of the performance of the air filter unit is 0.5 m/sec. in terms of a face velocity of the air filter unit. However, the shape of the air filter unit has various pleat depths and folding pitches as explained above. Therefore, even if the opening area of the air filter unit is the same, the total area of the air filter medium folded therein varies. Thus, the air filter units have different pressure losses or collection efficiencies, when they are produced using the same air filter medium.

The cause for such differences may be that, since the performance of the air filter unit depends on the air velocity through the air filter medium, the air velocity through the air filter medium varies when the number of pleats per the same unit opening area are different, and thus the pressure loss and the collection efficiency vary.

When the number of pleats is large, the filter medium passing velocity decreases so that the pressure loss decreases and the collection efficiency increases. When the number of pleats is small, the filter medium passing velocity increases so that the pressure loss increases and the collection efficiency decreases.

Accordingly, the velocity of the air, which passes through the folded air filter medium assembled in the air filter unit, should be made constant rather than fixing the air velocity on the face of the air filter unit, when the performances of the air filter units are compared. For such a reason, the performance of the air filter unit is relatively evaluated at 1.4 cm/sec. of the filter medium passing velocity (the velocity of the air passing through the folded air filter medium in the air filter unit).

In the concrete, at the filter medium passing velocity of 1.4 cm/sec., the air filter unit face velocity (blowing out velocity) can be set as follows:

When the opening area of the air filter unit is S m², and the folded area of the air filter medium is s m² (calculated from the height of the pleats and the number of the pleats), the air filter unit face velocity V is expressed by the formula:

$$V=1.4 \times s/S (\text{cm/sec.}) = (1.4/100) \times s/S (\text{m/sec.})$$

According to the present invention, a compact air filter unit which maintains the performance of ULPA can be obtained by the use of the air filter medium comprising the PTFE porous film and the air-permeable support member laminated on at least one surface of the PTFE porous film and having the above-defined $PF_1$ value exceeding 22.

The performance of ULPA includes a collection efficiency of at least 99.9995%, preferably at least 99.9999%, and a pressure loss of 15 mmH$_2$O or less at the face velocity of the air filter units used by users.

When the above-described air filter medium of the present invention is used, the air filter unit comprising the air filter pack having a pleat depth of 30 mm or less, preferably 27 mm or less, more preferably 20 mm or less.

For example, when an air filter unit comprising an air filter pack having a pleat depth of 30 mm is used at an air filter unit face velocity of 0.5 m/sec., which is the face velocity employed by the users, and the collection efficiency is set at 99.9999%, the pressure loss is 15 mmH$_2$O or less. When an air filter unit comprising an air filter pack having a pleat depth of 20 mm is used at an air filter unit face velocity of 0.35 m/sec. (in the case of a very thin air filter unit, it is usually used at a face velocity of 0.35 m/sec.), and the collection efficiency is set at 99.9999%, the pressure loss is 15 mmH2O or less. Accordingly, the air filter unit having a thickness of 30 mm or less can be produced while maintaining the high performance as ULPA.

The above performance of the air filter unit can be attained since, with the air filter medium of the present invention, the $PF_1$ value, which is the performance index of the pressure loss and the collection efficiency, is more than 22, preferably at least 23, more preferably at least 24, particularly preferably at least 25. That is, in the case of the conventional air filter medium having the $PF_1$ value of 22 or less, when the air filter unit has a pleat depth of 30 mm and the collection efficiency is set at 99.9999%, the pressure loss is larger than 15 mmH$_2$O at the air filter unit face velocity of 0.5 m/sec. When the pressure loss is set at 15 mmH$_2$O or less, the collection efficiency is less than 99.9999%. In addition, when the air filter unit having a pleat depth of 20 mm is used at the filter unit face velocity of 0.35 m/sec., and the collection efficiency is set at 99.9999%, the pressure loss is also larger than 15 mmH$_2$O at the air filter unit face velocity of 0.35 m/sec. When the pressure loss is set at 15 mmH2O or less, the collection efficiency is less than 99.9999%.

More surprisingly, when the pleat depth of the air filter medium is decreased, the structural resistance of the air filter unit suddenly decreases, and thus the inherent performance of the air filter medium is further reflected in the performance of the air filter unit.

The structural resistance is the friction resistance between the air and the air filter medium when the air passes through the gaps between the pleats, and the pressure loss of the air filter unit is expressed by the sum of the pressure loss and the structural resistance when the air passes through the air filter medium.

In the concrete, in the case of the mini-pleats type air filter unit having the pleat depth of 55 mm, when the face velocity of the air filter unit is 0.5 m/sec., the structural resistance becomes about 1 mmH2O. However, the structural resistance abruptly decreases when the pleat depth becomes 35 mm or less, and the structural resistance is substantially zero when the pleat depth is 30 mm or less. Therefore, the performance of the air filter unit is comparable with the inherent performance of the air filter medium.

The air filter media of the present invention can be used in the applications of the air filter packs and the air filter units of the present invention. In addition, the air filter media of the present invention may be processed in a suitable form and used as filters of air cleaners, filters of vacuum cleaners, filters of air conditioners, filters of air intakes of automobiles, filters of deodorizing machines, filters of exhausters of atomic power plants, filters of bio-clean rooms, filters of clean rooms for the production of medicines, filters of air intakes of operation rooms in hospitals, filters for precision equipment and machinery, masks for preventing pollens, inline filters for gasses (nitrogen, air, SiCl$_4$, etc.), filters for liquids such as water, chemicals, etc., and so on.

The air filter units of the present invention may be used in various applications such as clean rooms used in semiconductor industries, liquid crystal industries, medicinal and food industries, biotechnologies, etc.; and apparatuses for the production of semiconductors such as diffusion furnaces, coater developers, wet stations, chemical vapor deposition apparatuses, steppers, stockers, dry-etching apparatuses, plasma-etching apparatuses, clean booths, clean chambers, wafer-inspection apparatuses (surf-scan, prober), FFU (fan filter units), CMP, etc.

In particular, the thin-type air filter units can make FFU thin, or reduce the size of equipment since it can reduce the installation area, when such a unit is assembled in the apparatuses for the production of semiconductors. In addition, the air filter unit can be easily installed since it has a light weight. Thus, the air filter unit of the present invention is the epoch-making air filter unit.

EXAMPLES

The present invention will be illustrated by the following Examples.

In Examples, the thickness, packing density, average fiber diameter, pressure loss, collection efficiency, PF value and the presence of leakage of the PTFE porous films; the pressure loss, penetration, collection efficiency, $PF_1$ value and the presence of leakage of the air filter media, and the pressure loss, penetration, collection efficiency, $PF_3$ value, the presence of leakage and the amount of generated TOC of the air filter units were measured as described below.

In the measurements of the collection efficiency and the presence of leakage of the filter media and the air filter units, dioctyl phthalate (DOP) was used as test particles, although it may be possible to use other test particles which are proposed as particles which generate less TOC (e.g. silica particles, polystyrene latex particles, etc.)

Thickness of PTFE Porous Film

Five PTFE porous films were stacked, and the total thickness of the stacked films was measured with a film-thickness meter (1D-110 MH type manufactured by MITSUTOYO), and the measured value was divided by 5 to obtain the thickness of the single film.

Packing Density of PTFE Porous Film

The PTFE porous film, the thickness of which was measured, was cut in the size of 20 cm×20 cm, and weighed. Then, the packing density was calculated according to the following formula:

Packing density (%)=[Weight (g)/(400×thickness (cm)×2.25 (specific gravity of *PTFE*))]×100

Average Fiber Diameter of PTFE Porous Film

Using a scanning electron microscope (S-4000 manufactured by Hitachi Limited), a magnified photograph (7,000 times) of the PTFE porous film was taken. This photograph was enlarged to the size of a quarter, and four straight lines having the same length (24.5 cm in the vertical direction; 29.5 cm in the horizontal direction) were drawn in each of the vertical and horizontal directions of the photograph with a distance of 5 cm. Then, the diameters of the fibers on the lines were measured, and averaged to obtain an average fiber diameter.

Pressure Loss of PTFE Porous Film and Air Filter Medium (mmH$_2$O)

A sample of the PTFE porous film or the air filter medium was set on a filter holder having a diameter of 100 mm, and the entrance side was pressurized with a compressor while adjusting the air flow velocity of the air passing through the film or the member at 5.3 cm/sec. with a flow meter. Then, the pressure loss was measured with a manometer.

Collection Efficiency (%) of PTFE Porous Film and Air Filter Medium

A sample of the PTFE porous film or the air filter medium was set on a filter holder having a diameter of 100 mm, and the entrance side was pressurized with a compressor while adjusting the air flow velocity of the air passing through the film or the member at 5.3 cm/sec. with a flow meter.

Under such conditions, poly-dispersed DOP having a particle size of 0.1 to 0.12 µm was flowed from the upstream side at a particle concentration of $10^8$/300 ml, and the number of passed DOP particles having a particle size of 0.1 to 0.12 µm was counted with a particle counter (PMS LAS-X-CAT manufactured by PARTICLE MEASURING SYSTEM INC. (PMS INC.)) which was set on the downstream side. Then, the collection efficiency of the test sample was calculated according to the following formula:

Collection efficiency (%)=(1−*Co*/*Ci*)×100 wherein Ci is the particle concentration on the upstream side, and Co is the particle concentration on the downstream side.

With the air filter medium having the very high collection efficiency, the suction time was prolonged and the amount of sampled air was increased. For example, when the suction time was prolonged by ten times, the number of the particles counted on the downstream side was increased by ten times, that is, the sensitivity of the measurement was increased by ten times.

Penetration (%) of PTFE Porous Film and Air Filter Medium

The penetration of the PTFE porous film and the air filter medium was calculated according to the following formula:

Penetration (%)=100−collection efficiency (%)

PF Value of PTFE Porous Film and Air Filter Medium

The PF value of the PTFE porous film is calculated by the following formula:

*PF*=[−log(Penetration (%)/100)/Pressure loss (mmH$_2$O)]×100 in which Penetration (%)=100−collection efficiency (%).

The $PF_1$ value of the air filter medium was calculated according to the above-described formula:

Presence of Leakage of PTFE Porous Film and Air Filter Medium

A sample of the PTFE porous film or the air filter medium was set on a filter holder having a diameter of 100 mm, and the entrance side was pressurized with a compressor while adjusting the air flow velocity of the air passing through the film or the member at 5.3 cm/sec. with a flow meter.

Under such conditions, poly-dispersed DOP was flowed from the upstream side at a particle concentration of $10^8$/300 ml, and the number of passed DOP particles was counted for the various particle sizes with a particle counter. Then, the collection efficiencies of the DOP particles having a particle size of 0.1 to 0.12 µm, and of 0.25 to 0.35 µm were calculated. When the collection efficiency for the DOP particles having a particle size of 0.25 to 0.35 µm was at least 100 times larger than that for the DOP particles having a particle size of 0.1 to 0.12 µm, the PTFE porous film or the air filter medium was judged to have no leakage.

Pressure Loss (mmH$_2$O) of Air Filter Unit

Figure 3:
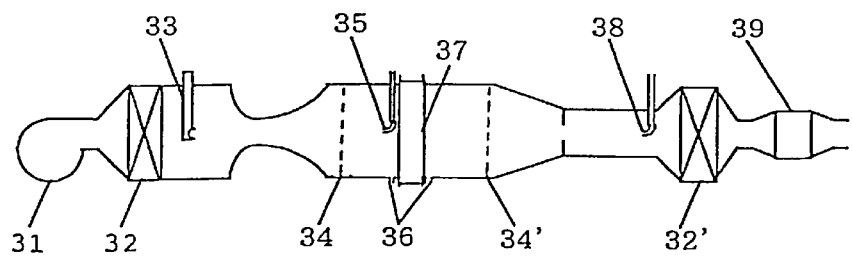
FIG. 3 is a schematic view of an apparatus for measuring a pressure loss of a filter unit.

The apparatus of FIG. 3 was used. After setting the air filter unit on the apparatus, the velocity of the air passing through the air filter medium was adjusted at 1.4 cm/sec., and the pressure loss caused by the filter unit was measured with a manometer.

The numerals in FIG. 3 are as follows:

31: blower, 32,32': HEPA filter, 33: inlet tube for introducing test particles, 34,34': flow straighters, 35: tube for collecting particles on the upstream side, 36: Apertures for measuring static pressure, 37: filter unit to be tested, 38: tube for collecting particles on the downstream side, 39: layer flow type flow meter.

Collection Efficiency (%) of Air Filter Unit

The apparatus of FIG. 3 was used. After setting the air filter unit on the apparatus, the velocity of the air passing through the air filter medium was adjusted at 1.4 cm/sec. Under such conditions, the DOP particles having a particle size of 0.1 to 0.12 μm was flowed on the upstream side at a concentration of $1\times10^9/ft^3$, and the number of the particles having a particle size of 0.1 to 0.12 μm was counted with a particle counter on the downstream side. Then, the collection efficiency of the test sample was calculated according to the following formula:

Collection efficiency (%)=(1−$C_o$/$C_i$)×100 wherein $C_i$ is the particle concentration on the upstream side, and $C_o$ is the particle concentration on the downstream side.

Penetration (%) of Air Filter Unit

The penetration of the air filter unit was calculated according to the following formula:

Penetration (%)=100−collection efficiency (%)

PF Value Of Air Filter Pack and Air Filter Unit

The PF2 value and the PF3 value of the air filter pack and the air filter unit were calculated according to the above-described formulae.

The performances of the air filter pack as such cannot be measured. Thus, for the measurements of the performances of the air filter pack, a frame is attached to the four sides of the air filter pack and the air filter pack and the frame are sealed to assemble the air filter unit, and the performances of the air filter unit are measured. Therefore, the $PF_2$ value of the air filter pack is the same as the $PF_3$ value of the air filter unit.

Leakage of Air Filter Unit

The leaking parts of the air filter unit were measured according to the method determined by JACA No. 10C, 4.5.4 ("KUUKI SEIJO SOHCHI SEINOH SHIKEN HOU-HOU KIJUN" (Standards of Methods for Testing Properties of Air Cleaning Apparatus) published by NIPPON KUUKI SEIJO KYOKAI (Japan Air Cleaning Association), 1979).

Firstly, silica aerosol, which is generated from a Laskin nozzle, is mixed in a clean air to prepare a test fluid containing the silica aerosol having a particle size of at least 0.1 μm at a concentration of $10^8/ft^3$ or more. Then, the test fluid is flown from the upstream of the air filter unit and passed through the air filter unit at a velocity of 0.5 m/sec. on the air filter unit face. Thereafter, the downstream air is suctioned at a rate of 28.3 liter/min. at a position of 25 mm from the air filter unit on the downstream side while scanning a scanning probe at a speed of 5 cm/sec., and the concentration of the silica aerosol is measured with a particle counter on the downstream side. The scanning is carried out over all the face of the air filter unit, that is, the filter medium and the joint parts between the filter medium and the frame, and the adjacent strokes are allowed to slightly overlap. If the leakage is present in the air filter unit, the particle distribution of the silica particles on the downstream side is the same as that on the upstream side and thus the presence of the leakage is detected.

Measurement of Amount of TOC Generated from Air Filter Unit

The amount of TOC generated from the air filter unit was measured as follows:

An air, which had been treated to remove particles and organic materials by passing the air through a HEPA filter and a chemical filter to remove the organic materials, was passed through an air filter unit to be tested. Then, the air on the downstream side was sampled by suction with a porous polymer adsorbent (TENAX GR) to adsorb the organic materials. The conditions for this measurement were as follows:

Air velocity passing through tested air filter unit: 0.35 m/sec.

Amount of sampled air on the downstream side: 2 liter/min×100 minutes.

Then, the organic materials adsorbed on the porous polymer adsorbent in the TENAX tube were analyzed with a Curie point purge and trap sampler (JHS-100A manufactured by NIPPON BUNSEKI KOGYO KABUSHIKIKAISHA). That is, the TENAX tube, which adsorbed the organic materials in the air on the downstream side, was heated at 230° C., and a high purity helium gas was flowed through the tube to purge the adsorbed materials in the gas form, and the purged gaseous materials were introduced in a trap tube. In the trap tube, the gaseous materials were accumulated and concentrated on an adsorbent (quartz wool) which was cooled at −40° C. Thereafter, the quartz wool adsorbent was heated at 358° C. in an instance to liberate the adsorbed materials in a gas form for 20 seconds. Then, the liberated gas was introduced in a gas chromatography column to measure the amount of the materials as the total amount of the organic materials. The amount of the generated organic materials was expressed in terms of "n $g/m^3$" from the total amount of the organic materials and the volume of the air sampled on the downstream side.

The analysis conditions of the gas chromatography were as follows:

Gas chromatography: GC14A (manufactured by Shimadzu Corp.)

Column: FRONTIER LAB ULTRA ALLOY Capillary Column UA-5

Column temperature: 50° C.→280° C. (10 minutes holding), heating rate: 10° C./min.

Example 1

A hydrocarbon oil (ISOPAR manufactured by ESSO OIL Co., Ltd.) (25 wt. parts) as an extrusion lubricant was added to a PTFE fine powder having an average molecular weight of 6.20 million (manufactured by Daikin Industries Ltd.) (100 wt. parts) and mixed.

The mixture was paste extruded to form a cylindrical rod. The rod was shaped in a film form with calender rolls heated at 70° C. to obtain a PTFE film. This film was passed through a hot air drying furnace at 250° C. to evaporate off the extrusion lubricant to obtain an unsintered film having an average thickness of 200 μm and an average width of 150 mm.

Then, the unsintered PTFE film was stretched in the machine direction at an expansion ratio of 5 with the apparatus shown in FIG. 1. The unsintered film was set on the roll 1, and the stretched film was wound on the winding roll 2. The stretching temperature was 250° C.

The machine direction-stretched film was stretched in the transverse direction at an expansion ratio of 30 with a tenter shown in the left side half of FIG. 2, which could continuously nipped the film with clips, and then heat set. In this step, the stretching temperature was 290° C., the heat setting temperature was 360° C., and the stretching rate was 330%/sec.

Example 2

The machine direction-stretched film obtained in Example 1 was stretched in the transverse direction at an expansion ratio of 40 with the tenter shown in the left side half of FIG. 2, and heat set. In this step, the stretching temperature was 290° C., the heat setting temperature was 350° C., and the stretching rate was 440%/sec.

Example 3

The machine direction-stretched film obtained in Example 1 was stretched in the transverse direction at an expansion ratio of 25 with the tenter shown in the left side half of FIG. 2, and heat set. In this step, the stretching temperature was 290° C., the heat setting temperature was 380° C., and the stretching rate was 275%/sec.

The properties of the PTFE porous films obtained in Examples 1, 2 and 3 are as follows:

TABLE 1

| Ex. No. | Film thickness ($\mu m$) | Packing density (%) | Average fiber diameter ($\mu m$) | Pressure loss (mm-$H_2O$) | Collection efficiency (%) | PF value | Leakage |
|---|---|---|---|---|---|---|---|
| 1 | 10 | 5 | 0.090 | 25 | 99.9999990 | 32.0 | No |
| 2 | 8 | 4 | 0.085 | 22 | 99.9999980 | 35.0 | No |
| 3 | 12 | 6 | 0.095 | 28 | 99.9999996 | 30.0 | No |

Example 4

On the both surfaces of the PTFE porous film obtained in Example 1, polyethylene-polyester fusion bondable non-woven fabrics (upper side: ELEVES T 0703 WDO (manufactured by UNTICA); lower side: ELEFIT E 0353 WTO (manufactured by UNTICA)) were fusion bonded using the apparatus of FIG. 2 to obtain an air filter medium. The fusion bonding conditions were as follows:

Heating temperature of roll 19: 160° C.

Line speed: 15 m/min.

Unwinding tension: 50g/cm (unwinding tension of the non-woven fabric 22)

Winding tension: 280 g/cm

Example 5

On the both surfaces of the PTFE porous film obtained in Example 1, polyethylene-polyester fusion bondable non-woven fabrics (upper side: ELEVES T 0703 WDO (manufactured by UNTICA); lower side: ELEFIT E 0353 WTO (manufactured by UNTICA)) were fusion bonded using the apparatus of FIG. 2 to obtain an air filter medium. The fusion bonding conditions were as follows:

Heating temperature of roll 19: 180° C.

Line speed: 15 m/min.

Unwinding tension: 20 g/cm (unwinding tension of the non-woven fabric 22)

Winding tension: 280 g/cm

Example 6

An air filter medium was prepared in the same manner as in Example 4 except that a cool air blower was provided just after the heat roll 19, and an air at 20° C. was blown on the air filter medium leaving the roll 19 to cool the filter medium.

Example 7

An air filter medium was prepared in the same manner as in Example 4 except that the PTFE porous film obtained in Example 2 was used.

Example 8

An air filter medium was prepared in the same manner as in Example 6 except that the PTFE porous film obtained in Example 2 was used.

Reference Example 1

On the both surfaces of the PTFE porous film obtained in Example 1, polyethylene-polyester fusion bondable non-woven fabrics (upper side: ELEVES T 0703 WDO (manufactured by UNTICA); lower side: ELEFIT E 0353 WTO (manufactured by UNTICA)) were fusion bonded using the apparatus of FIG. 2 under the conditions of Example 7 described in JP-A-6-218899 (heating temperature: 160° C.; line speed: 10 m/min.; unwinding tension: 90 g/cm) to obtain an air filter medium. The air filter medium was wound at a winding tension of 280 g/cm.

Reference Example 2

An air filter medium w as prepared in the same manner as in Reference Example 1 except that the PTFE porous film obtained in Example 2 was used.

The properties of the air filter media prepared in Examples 4 to 8 and Reference Examples 1 and 2 are as follows:

TABLE 2

|  | Pressure loss (mm$H_2O$) | Collection efficiency (%) | PF1 value | Leakage |
|---|---|---|---|---|
| Ex. 4 | 26 | 99.999983 | 26.0 | No |
| Ex. 5 | 26 | 99.999981 | 25.9 | No |
| Ex. 6 | 26 | 99.9999948 | 28.0 | No |
| Ex. 7 | 23 | 99.9999786 | 29.0 | No |
| Ex. 8 | 23 | 99.9999926 | 31.0 | No |
| Ref. Ex. 1 | 26 | 99.999653 | 21.0 | No |
| Ref. Ex. 2 | 23 | 99.998980 | 21.7 | No |

As understood from the above results, according to the present invention, the $PF_1$ values of the air filter media do not substantially decrease in comparison with the simple PTFE porous films, and a $PF_1$ value of exceeding 22 can be attained after the lamination of the air-permeable support member(s).

In addition, it can be understood from the results of Examples 6 and 8 that the $PF_1$ value can be further increased when the air filter media are cooled just after lamination.

As can be understood from the results of Reference Examples, the mild lamination conditions as described in JP-A-6-218899 can suppress the increase of the pressure loss but cannot prevent the deterioration of the collection efficiency. Even when the simple PTFE porous film had a high PF value, the $PF_1$ value of the air filter medium having the laminated air-permeable support member(s) decreased to less than 22.

Example 9

The air filter medium prepared in Example 4 was pleated at a height of 5.5 cm with a reciprocate pleating machine and then well-folded by heating at 90° C. Thereafter, the pleated air filter medium was once unfolded and a spacer of a polyamide hot melt resin was applied. Then, the air filter medium was stood up with a reciprocating standing machine in the pleated form, and cut to a size of 58 cm×58 cm to obtain an air filter pack. The distance of the pleats was 3.125 mm/pleat.

In the above process, the air filter medium was forcibly unwound with attaching a motor to a roll axis so that no force was applied to the air filter medium in the thickness direction. On conveying the air filter medium, no nip roll was used so that any compression force was not applied to the air filter medium.

Next, a frame of anodized aluminum having an outside dimension of 61 cm×61 cm, an inside dimension of 58 cm×58 cm and a thickness of 6.5 cm was provided, and the pleated air filter pack was installed in the frame. The periphery of the air filter pack and the aluminum frame were sealed with a urethane adhesive to assemble an air filter unit.

Example 10

An air filter unit was assembled in the same manner as in Example 9 except that the re-standing up of the unfolded air filter medium was carried out with a roll-raising machine.

Example 11

An air filter unit was assembled in the same manner as in Example 9 except that the air filter medium of Example 8 was used.

Reference Example 3

An air filter unit was assembled in the same manner as in Example 9 except that no heat was applied to the air filter medium after it was folded with the reciprocating pleating machine so that the member was not well-folded.

Reference Example 4

An air filter unit was assembled in the same manner as in Example 9 except that nip rolls were used when the air filter medium was unwound from the roll.

With the air filter units produced in Examples 9 to 11 and Reference Examples 3 and 4, the pressure loss and the collection efficiency were measured with adjusting the air velocity so that the filter medium passing velocity was 1.4 cm/sec.

When the filter medium passing velocity was 1.4 cm/sec. with these air filter units, the face velocity of the air filter unit was as follows:

Since the inside dimension of each air filter unit was 58 cm×58 cm, the opening area of the air filter unit was 58 cm×58 cm=3,364 cm$^2$=0.3364 m$^2$. With the folded air filter medium, the number of pleats was 580 mm/(3.125 mm/pleat)=185 pleats. Thus, the length of the air filter medium was 5.5 cm×185×2=2,035 cm=20.35 m. Since the width of the air filter medium was 58 cm=0.58 m, the area of the air filter medium was 20.35×0.58=11.803 m$^2$. From the opening area of the air filter unit and the area of the air filter medium, the face velocity of the air filter unit at the filter medium passing velocity of 1.4 cm/sec. was (1.4 cm/sec.×11.803 m$^2$)/0.3364 m$^2$=49.12 cm/sec.=0.4912 m/sec. The actual measurement of the pressure loss and so on were carried out based on this face velocity.

The properties of the air filter units produced in Examples 9 to 11 and Reference Examples 3 and 4 are as follows:

TABLE 3

|  | Pressure loss (mmH$_2$O) | Collection efficiency (%) | PF$_3$ value | Leakage |
|---|---|---|---|---|
| Ex. 9 | 7.5 | 99.9999925 | 95.0 | No |
| Ex. 10 | 7.6 | 99.9999879 | 91.0 | No |
| Ex. 11 | 6.9 | 99.9999974 | 109.9 | No |
| Ref. Ex. 3 | 12.4 | 99.9999892 | 56.2 | No |
| Ref. Ex. 4 | 7.5 | 99.9999213 | 81.4 | No |

As can be understood from the results of Table 3, the air filter media which were well-folded by heating after pleating with the reciprocal machine using no nip rolls could provide the air filter units having the intended high PF$_3$ values, while those produced by the conventional method (using nip rolls and applying no heat to the air filter medium pleated with the reciprocal machine) could not achieve a PF$_3$ value exceeding 90.6.

When the unfolded air filter media were again stood up in the pleated form, the use of the reciprocal machine was preferable than the roll-raising machine to achieve the higher PF$_3$ values.

Example 12

The air filter medium produced in Example 4 was pleated at a height of 13 cm with the reciprocal folding machine, and then well-folded by heating at 80° C. Thereafter, separators made of an aluminum foil having a thickness of 35 μm, which were corrugated at a height of 2.4 mm, were inserted between the pleats on both upstream and downstream sides, and then the filter medium was cut to a size of 58 cm×58 cm. The distance between pleats was 5.0 mm/pleat.

In the above process, the air filter medium was forcibly unwound with connecting a motor to a roll axis so that no force was applied to the air filter medium in the thickness direction. On conveying the air filter medium, no nip roll was used so that any compression force was not applied to the air filter medium.

Next, a frame of anodized aluminum having an outside dimension of 61 cm×61 cm, an inside dimension of 58 cm×58 cm and a thickness of 15 cm was provided, and the pleated air filter pack was installed in the frame. The periphery of the air filter pack and the aluminum frame were sealed with a urethane adhesive to assemble an air filter unit.

With this air filter unit, the pressure loss and the collection efficiency were measured with adjusting the air velocity so that the filter medium passing velocity was 1.4 cm/sec.

When the filter medium passing velocity was 1.4 cm/sec. with this air filter unit, the face velocity of the air filter unit was calculated in the same way as in Examples 9 to 11 and Reference Examples 3 and 4. The face velocity was 0.7279 m/sec. The actual measurement of the pressure loss and so on were carried out based on this face velocity.

The properties of the air filter units produced in Example 12 are as follows:

TABLE 4

| Pressure loss (mmH$_2$O) | Collection efficiency (%) | PF$_3$ value | Leakage |
|---|---|---|---|
| 7.1 | 99.9999910 | 99.2 | No |

Although the air filter units had different shapes as above, the air filter units had substantially the same properties, when the air filter units were made from the air filter media which were not deteriorated.

Example 13

An air filter unit was assembled in the same manner as in Example 9 except that the air filter medium produced in Example 4 was pleated at a height of 3.0 cm with the reciprocal folding machine.

Example 14

An air filter unit was assembled in the same manner as in Example 9 except that the air filter medium produced in Example 8 was pleated at a height of 3.0 cm with the reciprocal folding machine.

Example 15

An air filter unit was assembled in the same manner as in Example 9 except that the air filter medium produced in Example 4 was pleated at a height of 2.0 cm with the reciprocal folding machine.

Example 16

An air filter unit was assembled in the same manner as in Example 9 except that the air filter medium produced in Example 8 was pleated at a height of 2.0 cm with the reciprocal folding machine.

Reference Example 5

An air filter unit was assembled in the same manner as in Example 9 except that the air filter medium produced in Reference Example 1 was pleated at a height of 3.0 cm with the reciprocal folding machine.

Reference Example 6

An air filter unit was assembled in the same manner as in Example 9 except that the air filter medium produced in Reference Example 2 was pleated at a height of 3.0 cm with the reciprocal folding machine.

Reference Example 7

An air filter unit was assembled in the same manner as in Example 9 except that the air filter medium produced in Reference Example 1 was pleated at a height of 2.0 cm with the reciprocal folding machine.

Reference Example 8

An air filter unit was assembled in the same manner as in Example 9 except that the air filter medium produced in Reference Example 2 was pleated at a height of 2.0 cm with the reciprocal folding machine.

With these air filter units, the pressure loss and the collection efficiency were measured with adjusting the air velocity so that the filter medium passing velocity was 1.4 cm/sec.

When the filter medium passing velocity was 1.4 cm/sec. with these air filter units, the face velocity of the air filter units was calculated in the same way as in Examples 9 to 11 and Reference Examples 9 to 11. The face velocity for the units having the pleat depth of 30 mm was 0.2679 m/sec., and that for the units having the pleat depth of 2.0 mm was 0.1786 m/sec. The actual measurement of the pressure loss and so on were carried out based on this face velocity.

The properties of the air filter units produced in Examples 13 to 15 and Reference Examples 5 to 8 are as follows:

TABLE 5

|  | Pressure loss (mmH$_2$O) | Collection efficiency (%) | PF$_3$ value | Leakage |
|---|---|---|---|---|
| Ex. 13 | 7.0 | 99.9999921 | 101.5 | No |
| Ex. 14 | 6.2 | 99.9999971 | 121.6 | No |
| Ex. 15 | 6.9 | 99.9999927 | 103.4 | No |
| Ex. 16 | 6.1 | 99.9999976 | 124.9 | No |
| Ref. Ex. 5 | 7.0 | 99.999872 | 84.2 | No |
| Ref. Ex. 6 | 6.2 | 99.999548 | 86.2 | No |
| Ref. Ex. 7 | 6.9 | 99.999845 | 84.2 | No |
| Ref. Ex. 8 | 6.1 | 99.999514 | 87.1 | No |

Among the air filter units assembled in Examples 13 to 16 and Reference Examples 5 to 8, those having the pleat depth of 30 mm were subjected to the measurements of a pressure loss and a collection efficiency at a face velocity of 0.5 m/sec. The results are shown in Table 6.

Those having the pleat depth of 20 mm were subjected to the measurements of a pressure loss and a collection efficiency at a face velocity of 0.35 m/sec. The results are shown in Table 7.

TABLE 6

| | Face velocity of 0.5 m/sec. | |
|---|---|---|
| | Pressure loss (mmH$_2$O) | Collection efficiency (%) |
| Ex. 13 | 13.0 | 99.999945 |
| Ex. 14 | 11.5 | 99.999980 |
| Ref. Ex. 5 | 13.0 | 99.999104 |
| Ref. Ex. 6 | 11.5 | 99.99684 |

TABLE 7

| | Face velocity of 0.5 m/sec. | |
|---|---|---|
| | Pressure loss (mmH$_2$O) | Collection efficiency (%) |
| Ex. 15 | 13.5 | 99.999938 |
| Ex. 16 | 12.0 | 99.999980 |
| Ref. Ex. 7 | 13.5 | 99.99876 |
| Ref. Ex. 8 | 12.0 | 99.9961 |

It can be understood from the results shown in Table 5 that the pressure loss of the air filter unit was substantially in agreement with the value calculated from the pressure loss of the air filter medium. This may indicate that there was substantially no structural resistance. That is, in Examples 13 and 15 the pressure loss of the used air filter medium at 5.3 cm/sec. was 26 mmH$_2$O, and when the pressure loss at 1.4 cm/sec. was calculated from the pressure loss at 5.3 cm/sec., it was 26 mmH$_2$O×1.4/5.3=6.87 mmH$_2$O. This calculated pressure loss was substantially the same as the measured pressure loss. Similarly, in Examples 14 and 16, the pressure loss of the used air filter medium at 5.3 cm/sec. was 23 mmH$_2$O. When the pressure loss at 1.4 cm/sec. was calculated from the pressure loss at 5.3 cm/sec., it was 23 mmH2O×1.4/5.3=6.08 mmH$_2$O. This calculated pressure loss was substantially the same as the measured pressure loss.

It is also understood from the results shown in Tables 6 and 7 that, in the case of the air filter media having a PF$_1$ value of 22 or less, when the pleat depth was 30 mm or less, they had the low collection efficiencies at the air velocity which is actually employed by the users, and could not achieve not only the collection efficiency of 99.9999% but also the collection efficiency of 99.9995%, which is the general property of ULPA, while the air filter media having a $PF_1$ value exceeding 22 could achieve the property of ULPA even when the pleat depth was 30 mm or less.

The pressure losses of the air filter units shown in Tables 6 and 7 were substantially in agreement with those calculated from the pressure losses of the air filter media. This may indicate that there was substantially no structural resistance. The pressure losses of the air filter units calculated from the pressure losses of the air filter media were 12.82 mmH$_2$O for Example 13 and Reference Example 5 and 11.34 mmH$_2$O for Example 14 and Reference Example 6 in Table 6. The pressure losses of the air filter units calculated from the pressure losses of the air filter media were 13.46 mmH$_2$O for Example 15 and Reference Example 7 and 11.91 mmH$_2$O for Example 16 and Reference Example 8 in Table 7.

Example 17

An air filter unit was assembled in the same manner as in Example 9 except that an EVA hot melt resin was used as a spacer material. The applied amount of the spacer was the same as that in Example 9, and the sealing agent between the air filter pack and the aluminum frame was the same as that used in Example 9.

With the air filter units assembled in Examples 9 and 17, the amounts of TOC generated from the air filter were measured. The results are as follows.

TABLE 8

|  | TOC amount (ng/m$^3$) |
| --- | --- |
| Example 9 | 80 |
| Example 17 | 1500 |

It can be understood from the results shown in Table 8 that the air filter unit comprising the air filter pack which was produced from the air filter medium of the present invention using the polyamide hot melt resin as the spacer material could significantly suppress the generation of TOC and the amount of TOC was about one twentieth (1/20) of that of the air filter unit using the EVA hot melt resin as the spacer material.

What is claimed is:

1. An air filter medium comprising a porous polytetrafluoroethylene film and an air-permeable support member laminated on at least one surface of said porous film and having a $PF_1$ value exceeding 22, which is calculated according to the following formula:

$$PF_1 = (-\log(\text{Penetration }(\%)/100)/\text{Pressure loss (mmH}_2\text{O}))\times 100$$

in which the penetration (%)=100−Collection efficiency from a pressure loss (unit: mmH$_2$O) measured when an air is flowed through the air filter medium at a flow velocity of 5.3 cm/second and a collection efficiency (unit: %) measured using dioctyl phthalate having a particle size of 0.10 to 0.12 μm.

2. The air filter medium according to claim 1, wherein the pressure loss is at least 4 mmH$_2$O when the air is passed through the air filter medium at a flow velocity of 5.3 cm/sec.

3. The air filter medium according to claim 1 or 2, wherein the air-permeable support members are laminated on both surfaces of the polytetrafluoroethylene porous film.

4. The air filter medium according to claim 1, wherein said $PF_1$ value is at least 23.

5. The air filter medium according to claim 1, wherein said collection efficiency is at least 99.9%.

6. The air filter medium according to claim 5, wherein said collection efficiency is at least 99.99%.

7. The air filter medium according to claim 1, wherein said polytetafluoroethylene has a thickness of at least 5 μm.

8. The air filter medium according to claim 1, wherein said porous polytetrafluoroethylene film has a PF value of at least 27.

9. An air filter pack comprising a pleated air filter medium which comprises a porous polytetrafluoroethylene film and an air-permeable support member laminated on at least one surface of said porous film, and having a $PF_2$ value exceeding 90.6, which is calculated according to the following formula:

$$PF_2 = (-\log(\text{Penetration }(\%)/100)/\text{Pressure loss (mmH}_2\text{O}))\times 100$$

in which the penetration (%)=100−Collection efficiency from a pressure loss (unit: mmH$_2$O) measured when an air is flowed through the air filter pack at a filter medium passing velocity of 1.4 cm/second and a collection efficiency (unit: %) measured using dioctyl phthalate having a particle size of 0.10 to 0.12 μm.

10. The air filter pack according to claim 9, wherein the pressure loss of said air filter medium is at least 4 mmH$_2$O when the air is passed through the air filter medium at a flow velocity of 5.3 cm/sec.

11. The air filter pack according to claim 10, wherein a $PF_1$ value of said air filter medium exceeds 22.

12. The air filter pack according to any one of claims 9 to 11, which has a $PF_2$ value of at least 92.

13. The air filter pack according to claim 9, which has a collection efficiency of at least 99.9% when measured using dioctyl phthalate having a particle size of 0.10 to 0.12 μm while the air is passed through the pack at a filter medium passing velocity of 1.4 cm/sec.

14. The air filter pack according to claim 13, wherein said collection efficiency is at least 99.999%.

15. The air filter pack according to claim 9, which is a mini-pleats type filter pack comprising spacers of a polyamide hot melt resin.

16. The air filter pack according to claim 9, which has a pleat depth of 30 mm or less, and a pressure loss of 1 to 25.4 mmH$_2$O when the air is passed through the pack at a filter medium passing velocity of 1.4 cm/sec.

17. An air filter unit comprising a frame and an air filter pack comprising a pleated air filter medium stored in said frame, wherein said filter medium comprises a porous polytetrafluoroethylene film and an air-permeable support member laminated on at least one surface of said porous film, and said unit has a $PF_3$ value exceeding 90.6, which is calculated according to the following formula:

$$PF_3 = (-\log(\text{Penetration }(\%)/100)/\text{Pressure loss (mmH}_2\text{O}))\times 100$$

in which the penetration (%)=100−Collection efficiency from a pressure loss (unit: mmH$_2$O) measured when an air is flowed through the air filter unit at a filter medium passing velocity of 1.4 cm/second and a collection efficiency (unit: %) measured using dioctyl phthalate having a particle size of 0.10 to 0.12 μm.

18. The air filter unit according to claim 17, wherein the pressure loss of said air filter medium is at least 4 mmH$_2$O when the air is passed through the air filter medium at a flow velocity of 5.3 cm/sec.

19. The air filter unit according to claim 18, wherein a $PF_1$ value of said air filter medium exceeds 22.

20. The air filter unit according to any one of claims 17 to 19, which has a $PF_3$ value of at least 92.

21. The air filter unit according to claim 17, which has a collection efficiency of at least 99.9% when measured using dioctyl phthalate having a particle size of 0.10 to 0.12 µm while the air is passed through the unit at a filter medium passing velocity of 1.4 cm/sec.

22. The air fitter unit according to claim 21, wherein said collection efficiency is at least 99.999%.

23. The air filter unit according to claim 17, wherein said air filter pack comprising the air filter medium which is folded in the pleat form and stored in the frame is a mini-pleats type filter pack comprising spacers of a polyamide hot melt resin.

24. The air filter unit according to claim 17, wherein said air filter pack has a pleat depth of 30 mm or less, and said air filter unit has a pressure loss of 1 to 25.4 $mmH_2O$ when the air is passed through the unit at a filter medium passing velocity of 1.4 cm/sec.

* * * * *